US007380398B2

(12) United States Patent
Pfaff

(10) Patent No.: US 7,380,398 B2
(45) Date of Patent: Jun. 3, 2008

(54) HYDRAULIC METERING MODE TRANSITIONING TECHNIQUE FOR A VELOCITY BASED CONTROL SYSTEM

(75) Inventor: Joseph L. Pfaff, Wauwatosa, WI (US)

(73) Assignee: HUSCO International, Inc., Waukesha, WI (US)

( * ) Notice: Subject to any disclaimer, the term of this patent is extended or adjusted under 35 U.S.C. 154(b) by 199 days.

(21) Appl. No.: 11/397,363

(22) Filed: Apr. 4, 2006

(65) Prior Publication Data

US 2007/0227136 A1 Oct. 4, 2007

(51) Int. Cl.
*F16D 31/02* (2006.01)
*F15B 13/16* (2006.01)
*F15B 13/04* (2006.01)

(52) U.S. Cl. ............................ 60/327; 60/422; 91/361; 91/454

(58) Field of Classification Search .................. 60/327, 60/422, 459, 461; 91/361, 364, 446, 454
See application file for complete search history.

(56) References Cited

U.S. PATENT DOCUMENTS

| | | | |
|---|---|---|---|
| 3,954,046 A | 5/1976 | Stillhard | |
| 4,061,155 A | 12/1977 | Sopha | |
| 4,250,794 A | 2/1981 | Haak et al. | |
| 4,437,385 A | 3/1984 | Kramer et al. | |
| 5,201,177 A | 4/1993 | Kim | |
| 5,249,140 A | 9/1993 | Kessler | |
| 5,490,384 A | 2/1996 | Lunzman | |
| 5,666,806 A | 9/1997 | Dietz | |
| 5,701,793 A | 12/1997 | Gardner et al. | |
| 5,878,647 A | 3/1999 | Wilke et al. | |
| 5,947,140 A | 9/1999 | Aardema et al. | |
| 5,960,695 A | 10/1999 | Aardema et al. | |
| 6,282,891 B1 | 9/2001 | Rockwood | |
| 6,880,332 B2 | 4/2005 | Pfaff et al. | |
| 7,251,935 B2 * | 8/2007 | Zhang et al. | 60/461 |

* cited by examiner

*Primary Examiner*—Michael Leslie
(74) *Attorney, Agent, or Firm*—Quarles & Brady; George E. Haas

(57) ABSTRACT

The flow of fluid to a hydraulic actuator is controlled by a valve assembly which operates in different metering modes at various points in time for energy conservation. The metering mode to use is selected in response to the hydraulic load acting on the hydraulic actuator. Specifically, the present magnitude of hydraulic load is determined and compared to first and second thresholds. Below the first threshold only a first metering mode is activated, and only a second metering mode is activated above the second threshold. A combination of the first and second metering modes is utilized when the hydraulic load is between those thresholds, wherein the metering modes are used in proportion to a proportional relationship of the hydraulic load to the first and second thresholds. Using a metering mode combination in this manner smoothes transitions between the first and second metering modes.

22 Claims, 5 Drawing Sheets

EXTEND
METERING MODE
WITH LOW SIDE
REGENERATION

EXTEND
METERING MODE
WITH HIGH SIDE
REGENERATION

RETRACT
METERING MODE
WITH LOW SIDE
REGENERATION

EXTEND METERING MODE WITH LOW SIDE REGENERATION

EXTEND METERING MODE WITH HIGH SIDE REGENERATION

RETRACT METERING MODE WITH LOW SIDE REGENERATION

HYDRAULIC METERING MODE TRANSITIONING TECHNIQUE FOR A VELOCITY BASED CONTROL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to electrically controlled hydraulic systems for operating machinery, and in particular to determining in which one of a plurality of hydraulic fluid metering modes the system should operate at any given time.

2. Description of the Related Art

A wide variety of machines have members which are moved by a hydraulic actuator, such as a cylinder and piston arrangement, that is controlled by a hydraulic valve. Traditionally the hydraulic valve was manually operated by the machine user. There is a present trend away from manually operated hydraulic valves toward electrical controls and the use of electrohydraulic valves, such as those driven by solenoids. This type of control simplifies the hydraulic plumbing as the control valves do not have to be located near an operator station, but can be located adjacent the actuator being controlled. This change in technology also facilitates sophisticated computerized control of the machine functions.

Application of pressurized hydraulic fluid from a pump to the actuator and fluid flow back from the actuator to a reservoir is governed by an assembly of proportional solenoid operated spool valves. To control a cylinder-piston type hydraulic actuator for example, four solenoid valves are connected in the legs of a Wheatstone bridge with the supply line from the pump and return line to the reservoir coupled to two opposite bridge corners and two cylinder chambers connected to the other two corners, as described in U.S. Pat. No. 6,880,332. By selectively operating different pairs of the valves, fluid is conveyed to and drained from the cylinder chambers to extend and retract the piston rod. The amount that each valve opens is directly related to the magnitude of electric current applied to the solenoid coil, thereby enabling proportional control of the hydraulic fluid flow.

When an operator desires to move a member on the machine a joystick is operated to produce an electrical signal indicative of the direction and desired rate at which the corresponding hydraulic actuator is to move. The faster the actuator is desired to move the farther the joystick is moved from its neutral position. A control circuit receives a joystick signal and responds by producing a signal to open the pair of valves associated with the direction of the desired motion.

The aforementioned U.S. patent describes a velocity based hydraulic control system having a plurality of different metering modes which are selected to drive the actuator in the intended direction. The metering modes utilize fluid from different sources in the system and consume various amounts of power to operate the pump. Therefore, some metering modes are more energy efficient than others. However, a particular metering mode may only be available under certain operating conditions, such as requiring specific pressure relationships among sections of the hydraulic system.

The fundamental metering modes in which fluid from the pump supply line is supplied to one of the cylinder chambers and drained to the reservoir return line from the other chamber are referred to as “standard metering modes”, specifically a standard extension metering mode or a standard retraction metering mode. A hydraulic system also can employ regeneration metering modes in which fluid draining from one cylinder chamber is fed back through the valve assembly to supply the other cylinder chamber. In a regeneration metering mode, the fluid can flow between the chambers through either the corner of the valve bridge connected to the supply line, called “high side regeneration”, or through the valve bridge corner coupled to the reservoir return line in “low side regeneration”. In cross function regeneration metering modes, fluid exiting under pressure from one hydraulic actuator is routed, either through the supply line or the return line, to power another hydraulic actuator. The regeneration metering modes employ fluid being exhausted from a hydraulic actuator in place of fluid from the pump thereby saving energy than otherwise is required to drive the pump.

An electronic controller for the hydraulic system monitored the operating conditions that were used to determine the metering mode and automatically selected the most efficient mode that was functionally available. When the operating conditions changed so that it was advantageous to use another metering mode than that which was currently active, the system switched directly to the more efficient metering mode. This worked effectively in many situations, such as when a sharp load change occurred, for example upon the bucket of an excavator hitting the ground. However, abrupt metering mode transitions did not work well in other situations, such as when the excavator bucket was elevated in the air or when a telehandler boom was extending. In these latter situations, the abrupt metering mode transition often produced a jerk in the machine motion, which upset the machine operator who erroneously believed that the machine was malfunctioning. The prior solution involved restricting the occurrence of metering mode transitions to only when a sharp load changes took place. However, this dramatically limited the efficiency derived from having multiple metering modes.

SUMMARY OF THE INVENTION

A typical hydraulic system has a supply line that carries fluid from a pump, a return line which carries fluid back to a tank the feeds the pump, and a hydraulic actuator, such as a piston and cylinder arrangement coupled to the supply line and the return line by a plurality of valves which serves as a flow control mechanism. Each of the plurality of valves is selectively operated to control the flow of fluid to and from the hydraulic actuator in both standard and regeneration metering modes.

The process for selecting which metering mode to use at any point in time involves determining a parameter, referred to herein as the hydraulic load, which denotes an amount of force acting on the actuator. The magnitude of the hydraulic load is used to choose a particular metering mode from the plurality of available modes. The hydraulic system has a first state in which only a standard metering mode is active to control the actuator, and has a second state in which only a regeneration metering mode is active. In a third state, a combination of the standard and regeneration metering modes is utilized, which provides a state that smoothes a transition between the first and second states. While the third state is operational, two metering modes are used in proportion to a proportional relationship of the hydraulic load to the first and second thresholds.

Preferably, the change between the two metering modes occur at different levels of the hydraulic load depending upon the direction of that transition, thereby producing a transition function that has hysteresis. For example, a transition occurs from the first state to the third state when the magnitude of the hydraulic load traverses a first threshold and another transition occurs from the third state to the second state when the magnitude of the hydraulic load traverses a second threshold. Inversely, when the hydraulic load traverses a third threshold while in the second state, a transition takes place from the second state to a fourth state in which a second combination of the standard and regeneration metering modes is employed. Thereafter, upon the magnitude of the hydraulic load traversing a fourth threshold, a transition from the fourth state to the first state.

DETAILED DESCRIPTION OF THE INVENTION

Figure 1:
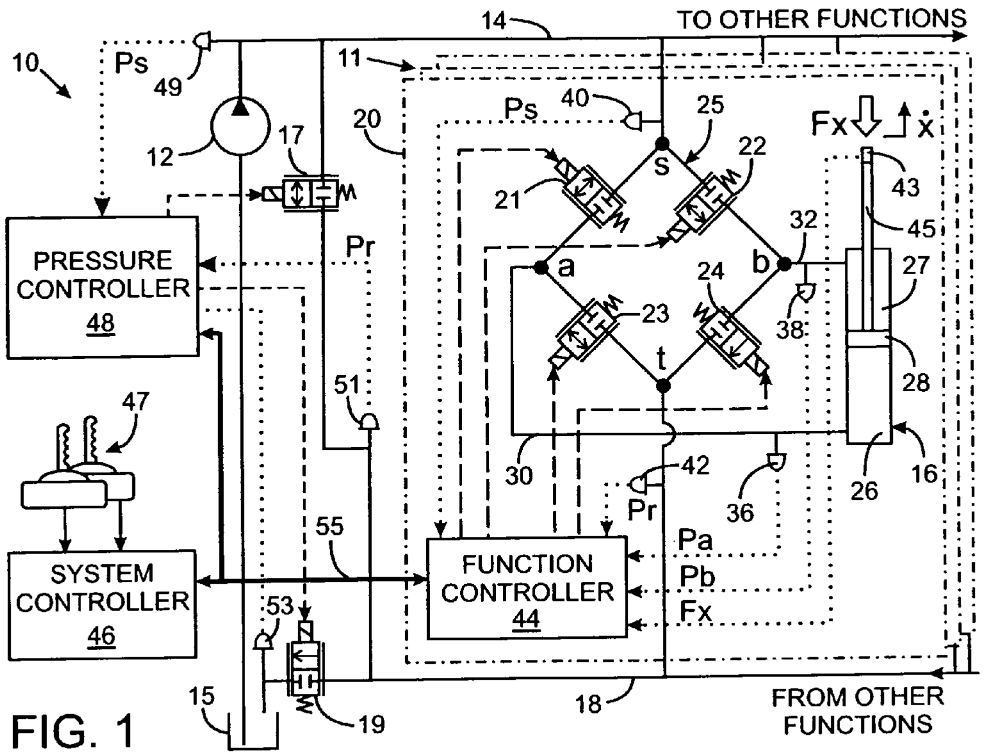
FIG. 1 is a schematic diagram of a hydraulic system that operates a plurality of actuators, such as cylinder and piston assemblies.

FIG. 1 shows a hydraulic system 10 for a machine is shown that has mechanical elements operated by hydraulically driven actuators, such as cylinder 16 or rotational motors. The hydraulic system 10 includes a positive displacement pump 12 that is driven by an engine or electric motor (not shown) to draw hydraulic fluid from a tank 15 and furnish the hydraulic fluid under pressure to a supply line 14. The supply line 14 is coupled to a tank return line 18 by a proportional unloader valve 17 and the tank return line 18 is connected by tank control valve 19 to the system tank 15. It should be understood that the novel techniques for apportioning fluid flow described herein also can be implemented on a hydraulic system that employs a variable displacement pump and other types of hydraulic actuators.

The supply line 14 and the tank return line 18 are connected to a plurality of hydraulic functions on the machine on which the hydraulic system 10 is located. One of those functions 20 is illustrated in detail and other functions 11 have similar components. A distributed type hydraulic system 10 is illustrated where the valves for each function and control circuitry for operating those valves are located adjacent to the actuator for that function. For example, those components for controlling movement of the arm with respect to the boom of an excavator are located at or near the arm's hydraulic cylinder.

In the given hydraulic function 20, the supply line 14 is connected to node "s" of a valve assembly 25, which has a node "t" that is connected to the tank return line 18. The valve assembly 25 includes a node "a" that is connected by a first hydraulic conduit 30 to the head chamber 26 of the cylinder 16, and has another node "b" which is coupled by a second conduit 32 to the rod chamber 27 of cylinder 16. Four electrohydraulic proportional (EHP) valves 21, 22, 23, and 24 control the flow of hydraulic fluid between the nodes of the valve assembly 25 and thus control fluid flow to and from the cylinder 16. The first EHP valve 21 is connected between nodes "s" and "a" and controls the flow of fluid between the supply line 14 and the head chamber 26 of the cylinder 16. The second EHP valve 22 is connected between nodes "s" and "b" to control fluid flow between the supply line 14 and the cylinder rod chamber 27. The third EHP valve 23 is connected between node "a" and node "t" and governs fluid flow between the head chamber 26 and the return line 18. The EHP valve 24, which is between nodes "b" and "t", controls the flow from the rod chamber 27 to the return line 18.

The components for the given hydraulic function 20 also include two pressure sensors 36 and 38 which detect the pressures Pa and Pb within the head and rod chambers 26 and 27, respectively, of cylinder 16. Another pressure sensor 40 measures the pump supply pressure Ps at node "s", while pressure sensor 42 detects the tank return pressure Pr at node "t" of the hydraulic function 20. It should be understood that the various pressures measured by these sensors may be slightly different from the actual pressures at these points in the hydraulic system due to line losses between the sensor and those points. However the sensed pressures relate to and are representative of the actual pressures and accommodation can be made in the control methodology for such differences. Further, all the pressure sensors may not be present for all functions 11.

The pressure sensors 36, 38, 40 and 42 for the hydraulic function 20 provide input signals to a function controller 44 which operates the four electrohydraulic proportional valves 21-24. The function controller 44 is a microcomputer based circuit which receives other input signals from a system controller 46, as will be described. A software program executed by the function controller 44 responds to those input signals by producing output signals that selectively open the four electrohydraulic proportional valves 21-24 by specific amounts to operate the cylinder 16 in a desired manner.

The system controller 46 supervises the overall operation of the hydraulic system exchanging signals with the function controllers 44 and a pressure controller 48. The signals are exchanged among the three controllers 44, 46 and 48 over a communication network 55 using a conventional message protocol. The pressure controller 48 receives signals from a supply line pressure sensor 49 at the outlet of the pump, a return line pressure sensor 51, and a tank pressure sensor 53. In response to those pressure signals and commands from the system controller 46 the pressure controller 48 operates the tank control valve 19 and the unloader valve 17. However, if a variable displacement pump is used, the pressure controller 48 controls the pump, instead of the unloader valve 17.

Figure 2:
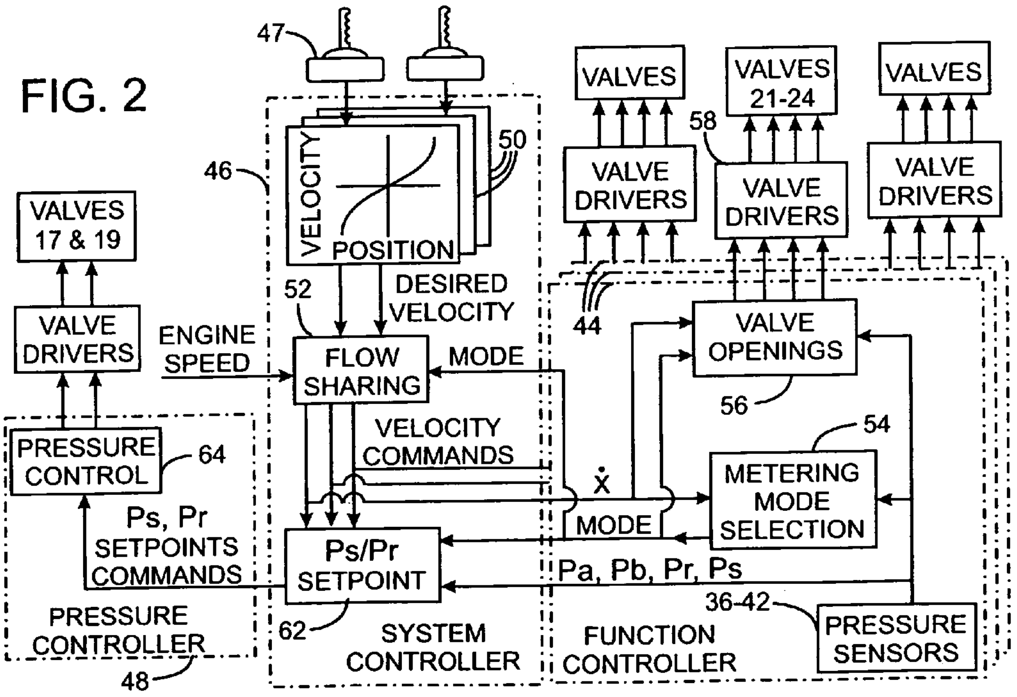
FIG. 2 is a control diagram for the hydraulic system.

With reference to FIG. 2, the control functions for the hydraulic system 10 are distributed among the different controllers 44, 46 and 48. A software program, executed by the system controller 46, responds to input signals by producing commands for the function controllers 44. Specifically, the system controller 46 receives signals from several joysticks 47 or similar input devices that are manipulated by the machine operator. Those signals are received by a separate mapping routine 50 which converts the joystick position signal into a signal indicating a desired velocity for the associated hydraulic actuator being controlled. The mapping routine may be implemented by an arithmetic expression that is solved by the microcomputer within system controller 46, or the signal conversion may be accomplished by a look-up table stored in the controller's memory. The output of the mapping routine 50 is a signal indicative of the desired velocity for the respective hydraulic function.

In an ideal situation the desired velocity is used to control the hydraulic valves associated with that hydraulic function. However, in many instances, the desired velocity may not be achievable in view of the simultaneous demands placed on the hydraulic system by other functions 11 of the machine. For example, the total quantity of hydraulic fluid flow demanded by all of the functions may exceed the maximum output of the pump 12, in which case, the control system must apportion the available quantity among the hydraulic functions demanding hydraulic fluid, and a given function may not be able to operate at the full desired velocity. Although that apportionment may not achieve the desired velocity of each hydraulic function, it still maintains the velocity relationship among the actuators as indicated by the machine operator.

In order to determine whether sufficient flows exist from all sources to produce the desired function velocities, the flow sharing routine 52 receives indications as to the metering mode of all active hydraulic functions. The flow sharing routine then compares the total amount of fluid available to the total flow volume than would be required if every hydraulic function operated at the desired velocity. The result of this processing is a set of velocity commands for the presently active hydraulic functions. Each such command designates the velocity at which the associated hydraulic function is to operate and the designated velocity may be less than the velocity desired by the machine operator, when there is insufficient supply flow. The flow sharing algorithm also may assign different priorities to the hydraulic functions. Therefore, when there is an insufficient fluid supply to power all the active functions at their desired velocities, a greater proportion of the available fluid is sent to higher priority hydraulic functions which thereby will operate closer to their desired velocities than will the lower priority hydraulic functions which receive disproportionately less fluid.

Each resultant velocity command is sent to the function controller 44 for the associated hydraulic function 11 or 20. The function controller 44 determines how to operate the electrohydraulic proportional valves 21-24 in order to drive the respective hydraulic actuator at the commanded velocity. As a first step in that determination, the hydraulic function controller 44 periodically executes a metering mode selection routine 54 which identifies the optimum metering mode which is available for the hydraulic function at that particular point in time.

Although the present metering mode selection method can be used to control different types of hydraulic actuators, for ease of explanation, consider metering modes for hydraulic functions that operate a hydraulic cylinder and piston arrangement, such as cylinder 16 and piston 28 in FIG. 1. It is readily appreciated that hydraulic fluid must be supplied to the head chamber 26 to extend the piston rod 45 from the cylinder 16, and fluid must be supplied to the rod chamber 27 to retract the piston rod 45 into the cylinder. However, because the piston rod 45 occupies some of the volume of the rod chamber 27, that chamber requires less hydraulic fluid to produce an equal amount of piston motion than is required by the head chamber. As a consequence, the amounts of fluid flow required are determined based upon whether the actuator is being extended or retracted.

The fundamental metering modes in which fluid from the pump is supplied to one of the cylinder chambers 26 or 27 and drained to the return line from the other chamber are referred to as "standard metering modes", specifically the "standard extend metering mode" and the "standard retract metering mode". The exemplary hydraulic system 10 also uses regeneration metering modes in which fluid being drained from one cylinder chamber 26 or 27 is fed back through the valve assembly 25 to supply the other cylinder chamber. In a regeneration metering mode, the fluid can flow between the cylinder chambers through either the supply line node "s", referred to as "high side regeneration" or through the return line node "t" in "low side regeneration". It should be understood that in a regeneration retraction mode, when fluid is being forced from the head chamber 26 into the rod chamber 27, a greater volume of fluid is draining from the head chamber than is required in the smaller rod chamber. The excess fluid is fed into the return line 18 during the low side regeneration metering mode and into the supply line 14 while high side regeneration is occurring. Regeneration also can occur when the piston rod 45 is being extended from the cylinder 16, in which case an insufficient volume of fluid is exhausting from the smaller rod chamber 27 than is required to fill the head chamber 26. During extension in the low side regeneration metering mode, additional fluid is received from the tank return line 18, and from the supply line 14 during high side regeneration. On a typical excavator, a given hydraulic function is configured to extend with the standard metering mode and either the low side or high side regeneration metering mode, thus have two metering modes from which to select. During retraction, usually only the standard and low side regeneration are available. However, all three types of metering modes may be available for functions on excavators or other kinds of equipment.

Selection of the most desirable metering mode to employ at a given time is performed by the selection routine 54 which designates the different metering modes by a numerical variable that has a value of zero to designate the low side regeneration metering mode, a value of one for the standard metering mode, and a value of two for designates the high side regeneration metering mode. The choice of the metering mode is based on the sensed pressures Pa and Pb in the cylinder chambers of the hydraulic function. From those cylinder chamber pressures, a value for a hydraulic load, designated $\Delta P_{LOAD}$, is derived according to the expression:

$$\Delta P_{LOAD}=Pa-Pb/R$$

where R is the ratio of the hydraulic cross sectional areas of the head and rod cylinder chambers 26 and 27, respectively. It should be noted that the hydraulic load varies not only with changes in the external force Fx exerted on the piston rod 45, but also with conduit flow losses and cylinder friction changes. Alternatively, an approximation (L) of the hydraulic load can be used wherein that value is derived by measuring the force Fx (e.g. by a load cell 43 on the piston rod) and using the expression: L=Fx/Ab. However, this approximation ignores conduit line losses and cylinder friction, which is acceptable for some hydraulic systems. With that alternative in mind, the present method will be described in the context of using the hydraulic load $\Delta P_{LOAD}$.

Standard and Low Side Regeneration Extend

Figure 3:
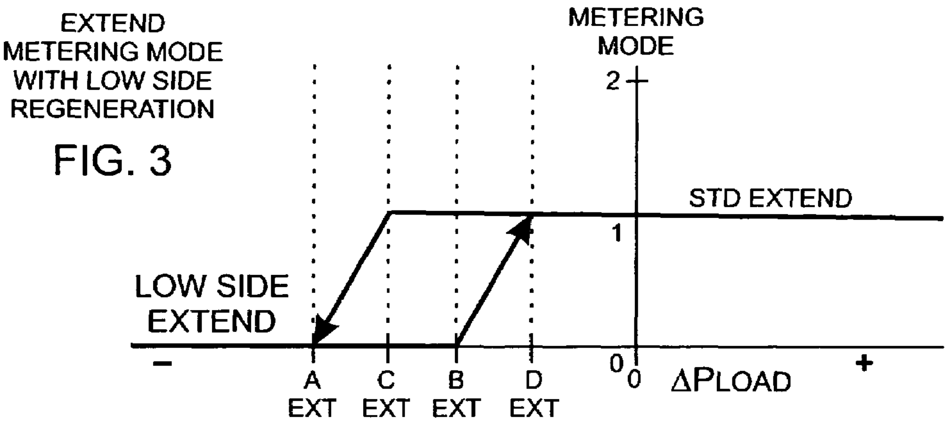
FIG. 3 is a graph depicting a relationship between the load on a hydraulic cylinder and one set of metering mode transitions during piston rod extension.

FIG. 3 graphically depicts operation of the hydraulic system to extend the piston rod from the cylinder using either the standard metering mode or low side regeneration. The transitions between the two metering modes occur at different levels of the hydraulic load $\Delta P_{LOAD}$ depending upon the direction of that transition, thereby producing a function that has hysteresis. The standard metering mode continues to be utilized until the hydraulic load $\Delta P_{LOAD}$ decreases below a first threshold $C_{EXT}$. Thereafter, a combination of the standard extend and low side regeneration metering modes are used until the hydraulic load $\Delta P_{LOAD}$ decreases to a second threshold $A_{EXT}$, below which only the low side regeneration metering mode is employed. In between the first and second thresholds the combination of the modes is determined proportionally based on a first ratio:

$$RATIO1 = \frac{\Delta P_{LOAD} - A_{EXT}}{C_{EXT} - A_{EXT}}$$

provided that if $C_{EXT}-A_{EXT}=0$, then RATIO1=0. The latter proviso is a safeguard in the event that a technician configures the system with threshold values that yield to a ratio that is arithmetically impossible to calculate.

When the hydraulic function is extending in the actuator in the low side regeneration metering mode and the hydraulic load $\Delta P_{LOAD}$ increases above a third threshold $B_{EXT}$, a combination of the standard extend and low side regeneration metering modes are used until the hydraulic load $\Delta P_{LOAD}$ increases to a fourth threshold $D_{EXT}$, above which only the standard extend mode is employed. As the hydraulic load is increasing between the third and second thresholds, the combination of the modes is determined proportionally based on a second ratio:

$$RATIO2 = \frac{\Delta P_{LOAD} - B_{EXT}}{D_{EXT} - B_{EXT}}$$

provided that if $D_{EXT}-B_{EXT}=0$, then RATIO2=0.

Figure 4:
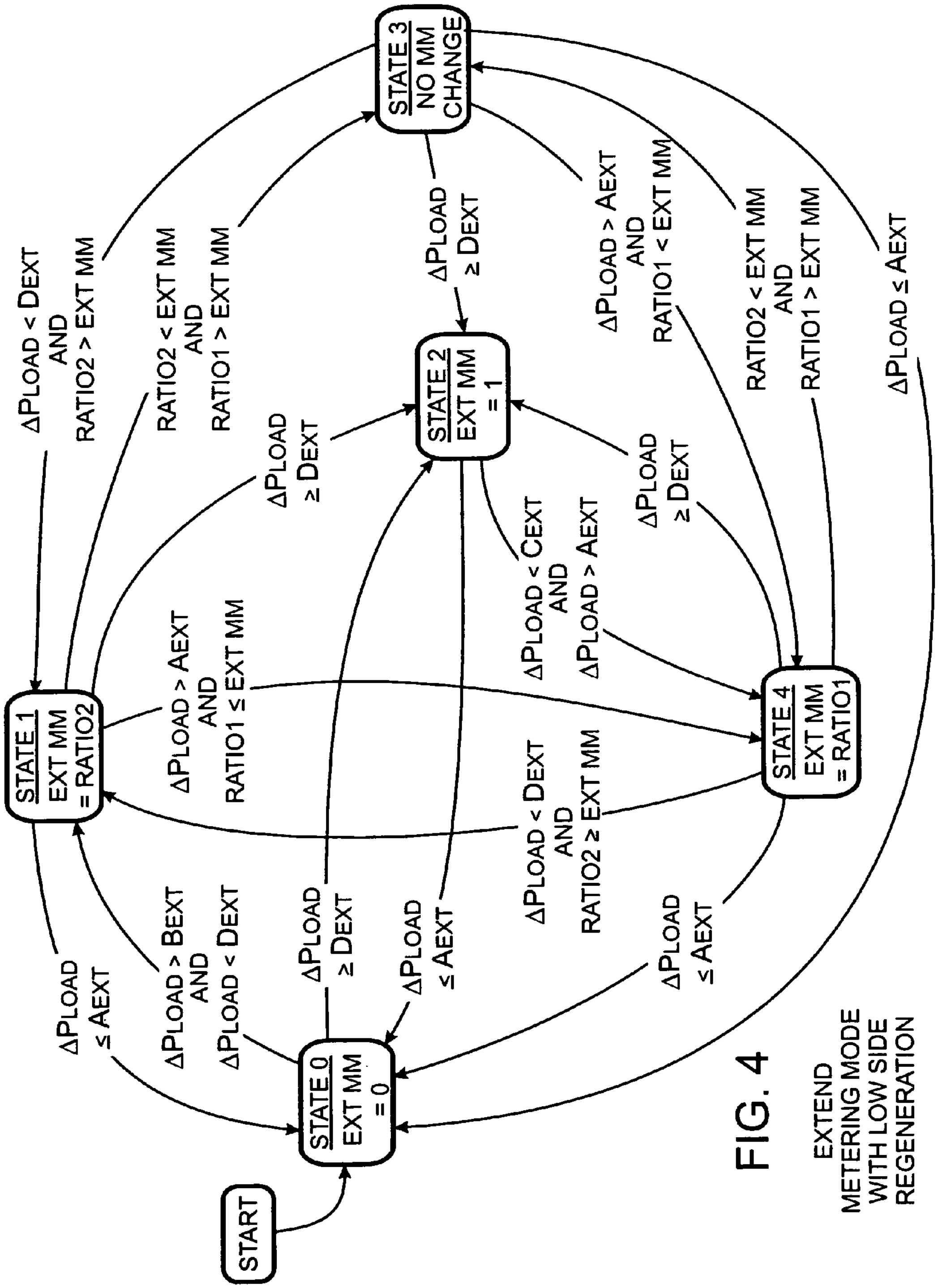
FIG. 4 is a state diagram which implements the metering modes transitions in FIG. 3.

The extension metering mode selection for a hydraulic actuator that can be operated in standard and low side regeneration, i.e. according to the graph of FIG. 3, is performed by a state machine implemented via software that is executed in the function controller 44 as represented in FIG. 4. When the machine starts-up, the metering mode selection routine 54 commences at State 0 at which the extension metering mode variable (EXT MM) is set to a value of zero designating the initial use of low side regeneration to extend the piston rod. If the value of the hydraulic load ($\Delta P_{LOAD}$) is greater than or equal to the fourth threshold $D_{EXT}$, a transition immediately occurs to State 2 at which the extension metering mode variable (EXT MM) is set to one indicating that the standard extend mode is to be utilized.

When the operator designates extension of a hydraulic actuator, the system controller 46 sends the appropriate velocity command to the associated function controller 44 where the command is processed by the metering mode selection routine 54.

However if while in State 0, the value of $\Delta P_{LOAD}$ is between the third and fourth thresholds $B_{EXT}$ and $D_{EXT}$, a transition occurs to State 1 in which the metering mode is a blend of the low side regeneration and standard metering modes for extension. That blending of the two metering modes is in a proportion determined by the expression for RATIO2 given above. Thus, the variable designating the metering mode will have a numerical value between zero and one which determines an apportionment of fluid flow control between the two metering modes, as will be described.

While the state machine is in State 1, if the hydraulic load $\Delta P_{LOAD}$ drops below the second threshold $A_{EXT}$, a return to State 0 takes place. Alternatively in State 1, if the hydraulic load is above the second threshold $A_{EXT}$ while the value of RATIO1 is less than or equal to the value of the extension metering mode variable EXT MM, a change occurs to State 4 at which a new variable value is calculated utilizing RATIO1. In another case in State 1, if a newly calculated value for RATIO2 is less than the value of variable EXT MM and the value for RATIO1 is greater than that variable, the state machine enters State 3 at which the previous value of the metering mode variable remains unchanged. Finally, if the hydraulic load $\Delta P_{LOAD}$ becomes greater than or equal to the fourth threshold $D_{EXT}$ while in state 1, a transition is made to State 2 at which the value of the extension metering mode variable EXT MM is set equal to one, so that the standard extension mode becomes active.

In State 2, the hydraulic load is compared to the four thresholds to determine whether a transition to another state should occur. Specifically, if the value of the hydraulic load $\Delta P_{LOAD}$ falls abruptly less than or equal to the second threshold $A_{EXT}$, the state machine enters State 0 in which the low side regeneration extension mode becomes active. Otherwise, when the hydraulic load $\Delta P_{LOAD}$ is within the range bounded by the first and second thresholds, $C_{EXT}$ and $A_{EXT}$, a transition occurs to State 4 where the value for the metering mode variable EXT MM is determined by RATIO1.

As noted previously, a transition can also occur from State 1 to State 3 at which the previously determined value for the metering mode variable is held constant. If while in this latter state, the hydraulic load $\Delta P_{LOAD}$ falls below the fourth threshold $D_{EXT}$ and the value of RATIO2 is greater than the present value for the metering mode variable (EXT MM) a transition occurs back to State 1. In another situation in State 3, should $\Delta P_{LOAD}$ become greater than or equal to the fourth threshold $D_{EXT}$, the state machine enters State 2 where the metering mode variable (EXT MM) is set equal to 1 so that the standard metering mode for extension is active. Alternatively in State 3, if the hydraulic load $\Delta P_{LOAD}$ is greater than the second threshold $A_{EXT}$ while the value of RATIO1 is less than the present value of the metering mode variable (EXT MM), the state machine enters State 4. Then again in State 3 a dramatic decrease of the hydraulic load $\Delta P_{LOAD}$ equal to or less than the second threshold $A_{EXT}$, results in a transition to State 0, where the low side regeneration metering mode is activated.

In State 4 where the metering mode is a blend of the standard metering mode and the low side regeneration as determined by RATIO1, transitions can occur to any of the other four states under certain conditions. A transition occurs to State 0 when the hydraulic load becomes equal to or less than the second threshold $A_{EXT}$. If while in State 4, the value of the hydraulic load is less than the fourth threshold $D_{EXT}$ and the value of RATIO2 is greater than or equal to the present value of the metering mode variable (EXT MM), State 1 becomes active. Alternatively, if the hydraulic load becomes equal to or greater than the fourth threshold $D_{EXT}$ in State 4, a transition occurs to State 2. If while in State 4 the value of RATIO1 is greater than the current value for the extension metering mode variable (EXT MM) and the value for RATIO2 is less than that variable, a transition is made to State 3 to maintain metering mode variable unchanged.

The metering mode selection routine 54 continues the state machine operation depicted in FIG. 4 until the equipment operator no longer designates extension the associated hydraulic actuator. At that time, the velocity command may go to zero which results in closure of all the associated hydraulic valves for this function. However, if the equipment operator makes a rapid switch to retract the piston rod of the associated hydraulic actuator, that action is reflected in a reversal of the velocity command and a selection of a retraction metering mode, described subsequently herein.

Standard and High Side Regeneration Extension

Figure 5:
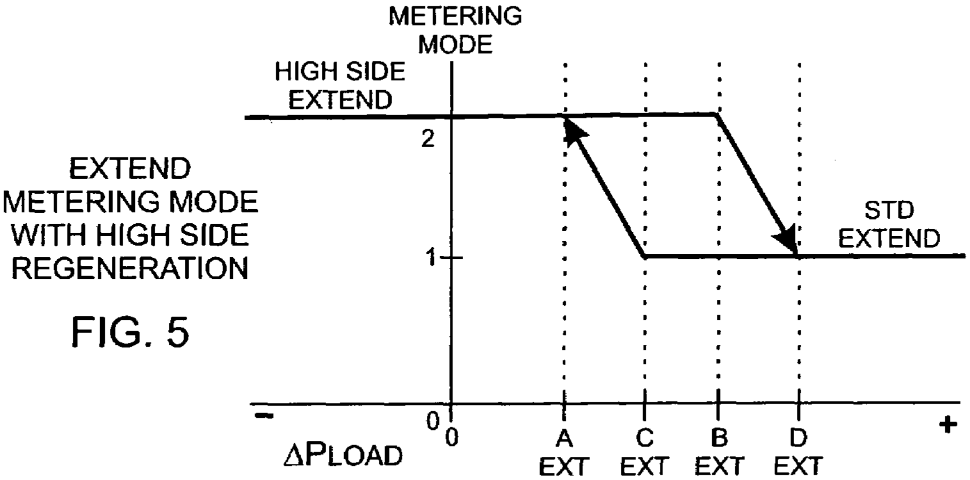
FIG. 5 is a graph depicting a relationship between the load on a hydraulic cylinder and another set of metering mode transitions during piston rod extension.

Alternatively, if the piston-cylinder extension can employ standard extend or high side regeneration metering modes, the selection of which mode to use is graphically depicted by FIG. 5. When the hydraulic function is extending the actuator in the high side regeneration metering mode and the hydraulic load $\Delta P_{LOAD}$ increases above the third threshold $B_{EXT}$, a combination of the standard extend and high side regeneration metering modes is used until the hydraulic load $\Delta P_{LOAD}$ exceeds the fourth threshold $D_{EXT}$, at which time only the standard extend mode is utilized. Between the third and fourth thresholds, the combination of the modes is determined proportionally based on the second ratio RATIO2 defined previously.

Upon becoming solely active, the standard extend metering mode continues until the hydraulic load $\Delta P_{LOAD}$ decreases below the first threshold $C_{EXT}$. Thereafter, a combination of the standard and high side regeneration extend metering modes is used until the hydraulic load $\Delta P_{LOAD}$ further decreases below the second threshold $A_{EXT}$. The proportion of the modes, used between the first and second thresholds, is determined by the first ratio RATIO1. Below the second threshold $A_{EXT}$ only the high side regeneration extend metering mode is employed.

Figure 6:
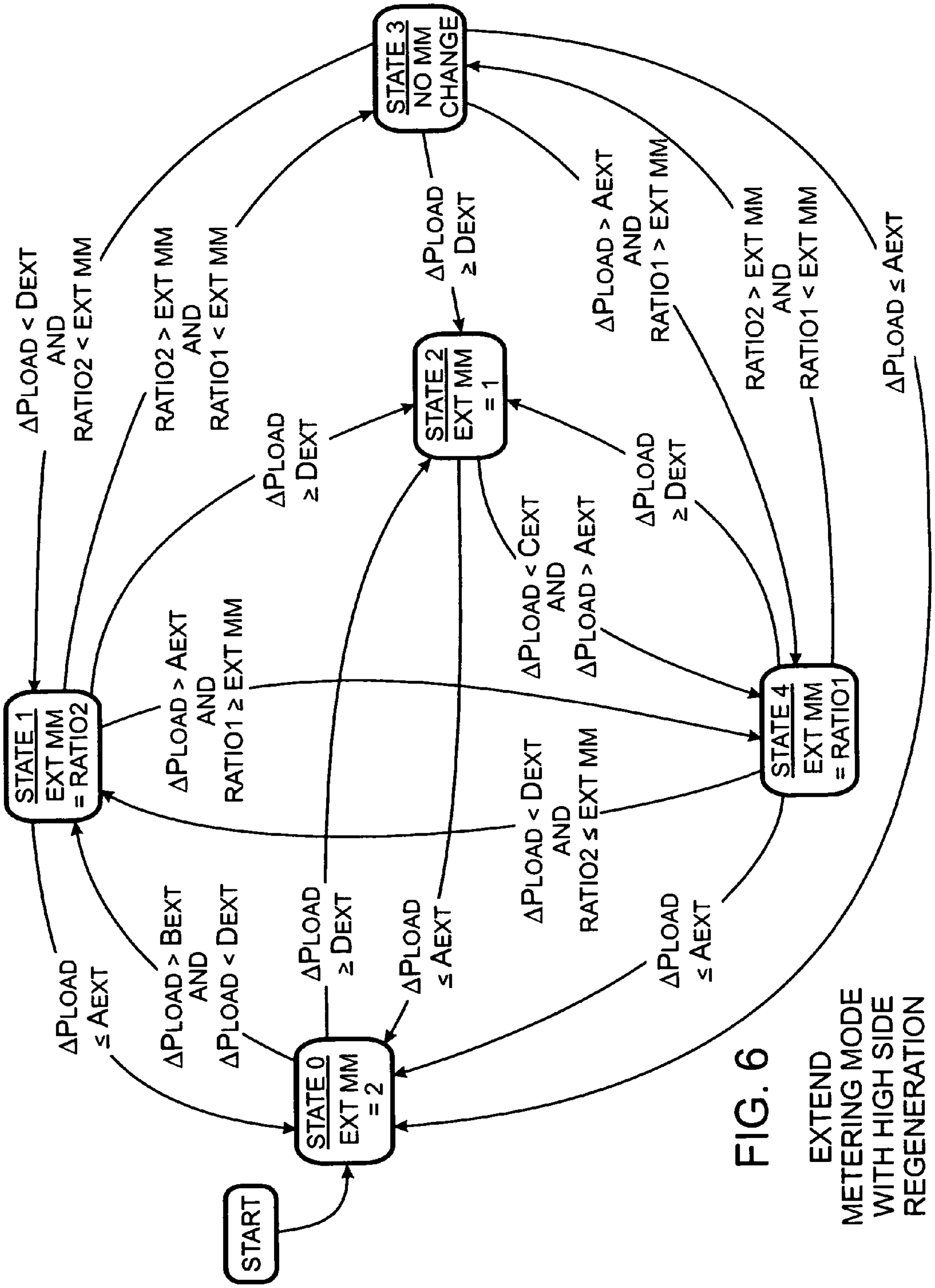
FIG. 6 is a state diagram which implements the metering modes transitions in FIG. 5.

The selection between standard extend and high side regeneration to operate the piston-cylinder arrangement is performed by the function controller 44 implementing the state machine depicted by the state diagram of FIG. 6. When the function controller 44 receives a new velocity command, the metering mode selection routine 54 commences at State 0 in which the extension metering mode variable (EXT MM) is set to a value of two designating the initial use of high side regeneration to extend the piston rod. If the value of the hydraulic load ($\Delta P_{LOAD}$) is greater than or equal to the fourth threshold $D_{EXT}$, a transition occurs to State 2 at which the extension metering mode variable (EXT MM) is set to one, thereby selecting that the standard extend mode.

However if while in State 0, the value of $\Delta P_{LOAD}$ is between the third and fourth thresholds $B_{EXT}$ and $D_{EXT}$, the state machine enters State 1 in which the metering mode is a blend of the high side regeneration and standard metering modes for extension. Those metering modes are blended in a proportion determined by the expression for RATIO2 given above. Thus, the variable (EXT MM) designating the extension metering mode has a numerical value between zero and one which determines an apportionment of fluid flow control between the two metering modes, as will be described.

While the state machine is in State 1, if the hydraulic load $\Delta P_{LOAD}$ drops below the second threshold $A_{EXT}$, a transition occurs back to State 0. Alternatively, if the hydraulic load is above the second threshold $A_{EXT}$ when a newly calculated value of RATIO1 is greater than or equal to the present value of the extension metering mode variable EXT MM, a change to State 4 is made at which a new value for that variable is calculated utilizing RATIO1. In another situation in State 1, if a newly calculated value for RATIO2 is less greater the variable EXT MM and the value for RATIO1 is less than that variable, a transition occurs to State 3 where the metering mode variable remains unchanged. Finally, if the hydraulic load $\Delta P_{LOAD}$ becomes greater than or equal to the fourth threshold $D_{EXT}$ while in State 1, a transition occurs to State 2 at which the extension metering mode variable EXT MM is set equal to one, so that the standard extension mode becomes active.

While the standard extend metering mode is active in State 2, if the value of the hydraulic load $\Delta P_{LOAD}$ falls abruptly less than or equal to the second threshold $A_{EXT}$, the state machine returns to State 0 in which the high side regeneration extension mode becomes active. Otherwise in State 2, if the hydraulic load $\Delta P_{LOAD}$ falls within the range bounded by the first and second thresholds, $C_{EXT}$ and $A_{EXT}$, the state machine enters State 4 where the value for the metering mode variable EXT MM is determined by RATIO1.

As noted previously, a transition can also occur from State 1 to State 3 at which the value of the metering mode variable remains unchanged. If while in this latter state, the hydraulic load $\Delta P_{LOAD}$ decreases below the fourth threshold $D_{EXT}$ and the value of RATIO2 is less than the present value for the metering mode variable (EXT MM), a transition occurs to State 1. In another situation while in State 3, should the value for $\Delta P_{LOAD}$ become greater than or equal to the fourth threshold $D_{EXT}$, the state machine enters State 2 where the metering mode variable (EXT MM) is set to 1 thereby selecting the standard metering mode for extension. Alternatively in State 3, if the hydraulic load $\Delta P_{LOAD}$ is greater than the second threshold $A_{EXT}$ while the value of RATIO1 is greater than the present value of the metering mode variable (EXT MM), a transition occurs to State 4. Then again in State 3 a dramatic decrease of the hydraulic load $\Delta P_{LOAD}$ equal to or less than the second threshold $A_{EXT}$, results in a return to State 0.

In State 4 where the metering mode is a blend of the standard node and high side regeneration as determined by RATIO1, transitions can occur to any of the other four states under certain conditions. A transition is made to State 0 when the hydraulic load becomes equal to or less than the second threshold $A_{EXT}$. If while in State 4, the value of the hydraulic load is less than the fourth threshold $D_{EXT}$ and the value of RATIO2 is less than or equal to the present value of the metering mode variable (EXT MM), State 1 becomes active. Alternatively, if the hydraulic load becomes equal to or greater than the fourth threshold $D_{EXT}$ in State 4, a transition occurs to State 2. If while in State 4 the value of RATIO2 is greater than the current value for the extension metering mode variable (EXT MM) and the value for RATIO1 is less than that variable, control change s to State 3.

The metering mode selection routine 54 continues the state machine operation depicted in FIG. 4 until the equipment operator no longer designates extension the associated hydraulic actuator. Depending on the action of the operator, the velocity command either goes to zero causing all the valves to close, or a reverses to indicate piston rod retraction causing selection of a retraction metering mode.

Standard and Low Side Regeneration Retraction

When the machine operator operates the joystick 47 to retract the piston rod into the cylinder, the system controller 46 produces a velocity command designating that motion. The respective function controller 44 receives that command which is used by its metering mode selection routine 54 to select the standard retract metering mode, the low side regeneration retraction mode or a combination of those modes.

Figure 7:
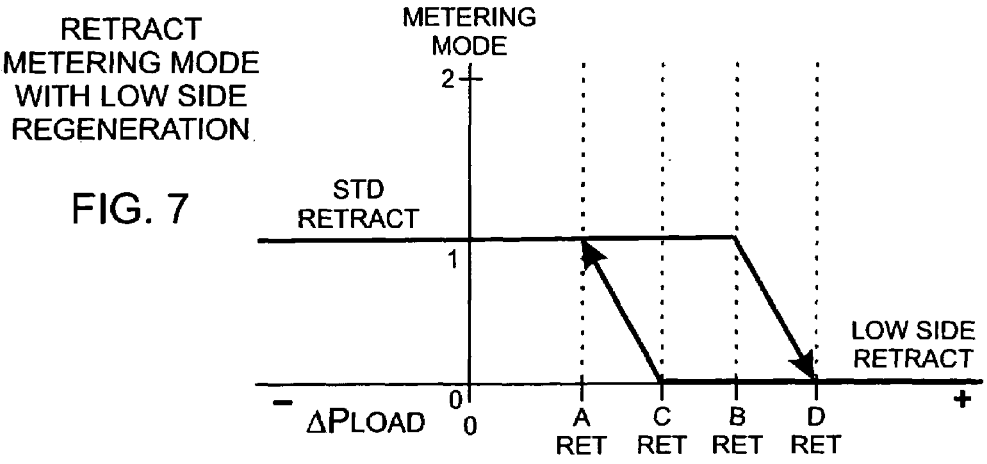
FIG. 7 is a graph depicting a relationship between the load on a hydraulic cylinder and metering mode transitions during piston rod retraction.

The selection of which mode to use is graphically depicted in FIG. 7. The hydraulic function defaults initially to use the standard retract metering mode. That mode remains solely active until the hydraulic load $\Delta P_{LOAD}$ increases above the third threshold $B_{RET}$. Thereafter, a combination of the standard and low side regeneration retract metering modes is used until the hydraulic load $\Delta P_{LOAD}$ rises beyond the fourth threshold $D_{RET}$, above which only low side regeneration is employed. The proportion of the modes, used between the third and fourth thresholds, is defined by the second ratio RATIO2.

Once solely in low side regeneration, that retract mode remains active until the hydraulic load $\Delta P_{LOAD}$ decreases below the first threshold $C_{RET}$, after which a combination of the standard and low side regeneration metering modes, specified by the first ratio RATIO1, is used. Use of that mode combination continues until the hydraulic load $\Delta P_{LOAD}$ decreases below the second threshold $A_{RET}$, at which time only the standard retract mode is utilized.

Figure 8:
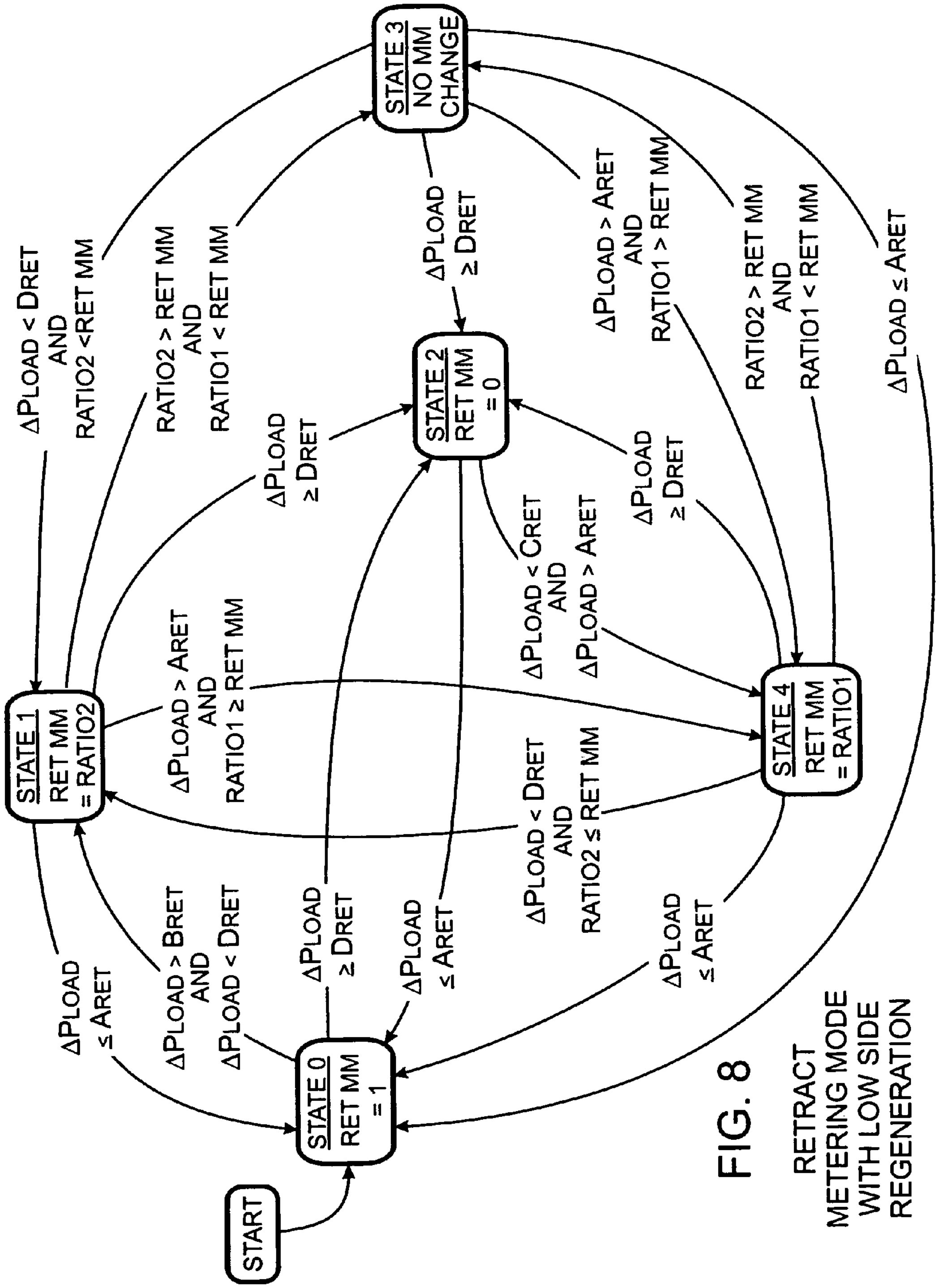
FIG. 8 is a state diagram which implements the metering modes transitions in FIG. 7.

The choice between standard and low side regeneration retraction modes is made by the function controller 44 executing the state machine depicted by the state diagram of FIG. 8. When the function controller 44 receives a new velocity command, the metering mode selection routine 54 commences at State 0 in which the retraction metering mode variable (RET MM) is set to a value of one designating the initial use of the standard retract metering mode. If the value of the hydraulic load ($\Delta P_{LOAD}$) is greater than or equal to the fourth threshold $D_{RET}$, the state machine enters State 2 at which the retraction metering mode variable (RET MM) is set to zero, thereby selecting low side regeneration.

However if while in State 0, the value of $\Delta P_{LOAD}$ is between the third and fourth thresholds $B_{RET}$ and $D_{RET}$, a transition occurs to State 1 in which the metering mode is a blend of the low side regeneration and standard retract metering modes as determined by RATIO2. Thus, the variable (RET MM) designating the retraction metering mode has a numerical value between zero and one which determines an apportionment of fluid flow control between the two metering modes.

While the state machine is in State 1, if the hydraulic load $\Delta P_{LOAD}$ drops equal to or less than the second threshold $A_{RET}$, a return to State 0 occurs. Alternatively, if the hydraulic load remains above the second threshold $A_{RET}$, while a newly calculated value of RATIO1 is greater than or equal to the present value of the retraction metering mode variable RET MM, a change occurs to State 4, at which that variable is calculated utilizing RATIO1. In another situation in State 1, if a newly calculated value for RATIO2 is greater than variable RET MM and the value for RATIO1 is less than that variable, a transition occurs to State 3 where the metering mode variable remains unchanged. If the hydraulic load $\Delta P_{LOAD}$ becomes greater than or equal to the fourth threshold $D_{RET}$ while in State 1, the state machine enters State 2 at which the retraction metering mode variable RET MM is set equal to zero, so that the low side regeneration metering mode becomes active.

In State 2, the hydraulic load is compared to the four thresholds, depicted in FIG. 7, to determine whether to change to another state. Specifically, if the value of the hydraulic load $\Delta P_{LOAD}$ falls abruptly less than or equal to the second threshold $A_{RET}$, the state machine returns to State 0 in which the standard retract metering mode becomes active. Otherwise in State 2, if the hydraulic load $\Delta P_{LOAD}$ falls within the range bounded by the first and second thresholds, $C_{RET}$ and $A_{RET}$, a transition takes place to State 4 where the metering mode variable RET MM is set by the expression for RATIO1.

In State 3, if the hydraulic load $\Delta P_{LOAD}$ decreases below the fourth threshold $D_{RET}$ and the value of RATIO2 is less than the present value for the metering mode variable (RET MM) operation jumps to State 1. In another situation while in State 3, should the value for $\Delta P_{LOAD}$ become greater than or equal to the fourth threshold $D_{RET}$, the state machine enters State 2 where the retract metering mode variable (RET MM) is set to zero, thereby selecting the low side regeneration. When in State 3 the hydraulic load $\Delta P_{LOAD}$ increases above the second threshold $A_{RET}$ while the value of RATIO1 becomes greater than the existing value of the metering mode variable (RET MM), a transition occurs to State 4. Then again at State 3, a dramatic decrease of the hydraulic load $\Delta P_{LOAD}$ equal to or less than the second threshold $A_{RET}$, results in a return to State 0 where the standard retract metering mode is activated.

During retraction in State 4, where the metering mode is a blend of the standard metering mode and the high side regeneration as defined by RATIO1, a change to State 0 happens when the hydraulic load $\Delta P_{LOAD}$ becomes equal to or less than the second threshold $A_{RET}$. If while in State 4, the value of the hydraulic load is less than the fourth threshold $D_{RET}$ and the value of RATIO2 is less than or equal to the present value of the metering mode variable (RET MM), State 1 becomes active. Alternatively, if the hydraulic load $\Delta P_{LOAD}$ becomes equal to or greater than the fourth threshold $D_{RET}$ in State 4, a transition is made to State 2. In another situation in State 4, when the value of RATIO1 is less than the current value for the retraction metering mode variable (RET MM) and the value for RATIO2 is greater than that variable, control changes to State 3.

The metering mode selection routine 54 continues the state machine operation depicted in FIG. 4 until the equipment operator no longer designates extension the associated hydraulic actuator. At that time, the velocity command goes to zero which results in closure of all the associated hydraulic valves for this function. However, if the equipment operator makes a rapid command switch from retracting to extending the piston rod, that action is reflected in a reversal of the velocity command and a selection of an extension metering mode.

Gradually changing between two metering modes by varying a blend of those modes, as described previously herein, has particular application to machines in which the force acting on the hydraulic actuator varies as the actuator operates. For example, the load force applied by the boom and arm assembly of a backhoe or excavator to the hydraulic actuator changes as that assembly extends and retracts with respect to the tractor. For other machines, such as telehandlers, the load force acting on the hydraulic actuator does not change as the boom extends and retracts and using the value of the metering mode variable (EXT MM or RET MM) produced by the previously described state machines may still produce a relatively abrupt transition between the metering modes. For these latter machines, the signal denoting the value of the metering mode variable is additionally rate limited and filtered to further smooth transitions of that signal to a different metering mode.

Valve Opening Routine

With reference to FIGS. 1 and 2, the selected metering mode along with the pressure measurements and the velocity command are conveyed to the valve opening routine 56 and employed to operate the electrohydraulic proportional valves 21-24 in a manner that achieves the commanded velocity of the piston rod 45. The valve opening routine 56 produces a set of four output signals which designate the amount, if any, that each of those valves is to open, with a zero value indicating valve closure. The resultant four output signals are sent from the function controller 44 to a set of valve drivers 58 which produce electric current levels that operate corresponding valves 21-24.

When only the standard or a regeneration mode is active, only two of the valves 21-24 in assembly 25 of FIG. 1 are active, or open, with the metering mode defining which pair of valves those are. In the standard extension mode, the first and fourth valves 21 and 24 are opened and the other valves are closed. For the standard retract metering mode, the second and third valves 22 and 23 are opened and the other valves are closed. When the low side regeneration metering mode is used to extend the piston rod, only the third and fourth valves 23 and 24 open with any required additional fluid being drawn from the return line 18. For the high side regeneration extend mode, only the first and second valves 21 and 22 open with any required additional fluid being drawn from the supply line 14. In the low side regeneration metering mode is used to extend the piston rod, only the third and fourth valves 23 and 24 open with excess fluid being fed into the return line 18.

As previously described, several of the machine states set the respective metering mode variable (EXT MM or RET MM) to a non-integer value designating a blended transition between standard and regeneration metering modes. That is rather than an abrupt switch from one metering mode to another, both metering modes are active for an interval to provide a gradual changeover. For example, when the extension metering mode variable (EXT MM) has a value of 0.25, an apportioned combination of standard and low side regeneration extension metering modes is used. The valve opening routine 56 computes the amounts that the respective valves would be opened if only the low side regeneration extension metering mode is to be used and then multiples those amounts by 0.25. Then the valve opening routine 56 computes the amounts that the respective valves would be opened if only the standard extension metering mode is to be used and then multiples those amounts by a 0.75 (i.e. 1.00–0.25). These calculations determine the apportionment of the two metering modes that is to be used. Then the calculations result for each valve are added to establish the actual amount that the valves are to open. Other values of the extension metering mode variable produce similar apportionment of the various metering modes. For example, a value of that variable between one and two produces a blending of the standard extension and high side regeneration extension modes. A similar computation is performed to blend the metering modes during retraction of the piston rod.

Supply and Return Line Pressure Control

The chosen metering modes for the hydraulic functions also are employed by the system and pressure controllers 46 and 48 to control the pressure Ps in the supply line 14 and the pressure Pr in the return line 18. In order for a smooth transition to occur between metering modes, it is desirable that any fluid received from either the supply or return line 14 and 18 be at the proper pressure level at the time of the transition. Previous systems that abruptly switched between metering modes, also abruptly changed the pressure levels in the supply and return lines based on the selected metering mode. A gradual pressure change is preferred. Therefore, the present system, in which metering mode transitions involve a proportional blending, also blends the supply and return line pressure levels to further smooth the effects of such transitions.

Determination of the desired supply line pressure Ps and return line pressure Pr is performed by the Ps/Pr setpoint routine 62 in the system controller 46. That routine 62 calculates the required setpoints for the supply and return line pressures for each hydraulic function and then selects the highest of those setpoints for each line to use in controlling the respective pressure. For a given hydraulic function, the sensed pressures and the metering mode variable are used to determine the pressure requirements from the supply and return lines. When the metering mode variable indicates a combination of metering modes, the pressure requirements for each of those metering modes is first determined as though only that mode was active. Then, the respective pressure requirements for the supply line 14 are combined in proportion to the value of the metering mode variable and the result is that function's required pressure setpoint for the supply line. A similar calculation is performed for the function's required return line pressure setpoint.

The required supply line setpoints for all the hydraulic functions then are compared and the greatest one is selected as the PS setpoint for use by the pressure control routine 64 in regulating the pressure in the supply line 14. The greatest of the required return line setpoints from all the hydraulic functions is similarly used by the control routine 64 in regulating the pressure in the return line 18.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method of controlling flow of fluid to an actuator in a hydraulic system that has plurality of metering modes, said method comprising:

determining a magnitude of a hydraulic load for the actuator;

in response to the magnitude of the hydraulic load, selecting a first metering mode when the magnitude of the hydraulic load is less than a first threshold, choosing a second metering mode when the magnitude of the hydraulic load is greater than a second threshold, and choosing a combination of the first metering mode and the second metering mode when the magnitude of the hydraulic load is between the first threshold and the second threshold, thereby producing a metering selection; and operating a flow control device to control flow of fluid to the actuator in response to the metering selection.

2. The method as recited in claim 1 wherein the combination comprises a standard metering mode and a regeneration metering mode.

3. The method as recited in claim 1 wherein the first and second metering modes are selected from a group consisting essentially of standard retract, standard extend, high side regeneration extend, high side regeneration retract, low side regeneration extend, and low side regeneration retract.

4. The method as recited in claim 1 wherein the combination is a proportion of the first metering mode and the second metering mode as determined based on a relationship of the magnitude of the hydraulic load to at least one of the first threshold and the second threshold.

5. The method as recited in claim 4 wherein the relationship (RATIO) is given by:

$$RATIO = \frac{\Delta P_{LOAD} - THRESHOLD1}{THRESHOLD2 - THRESHOLD1}$$

where $\Delta P_{LOAD}$ is the magnitude of the hydraulic load, THRESHOLD1 is the first threshold and THRESHOLD2 is the second threshold.

6. The method as recited in claim 1 wherein pressure of fluid being supplied to the actuator is controlled in response to a proportion in which the first and second metering modes are combined.

7. A method of controlling flow of fluid to an actuator in a hydraulic system that has plurality of metering modes, said method comprising:

determining a magnitude of a hydraulic load for the actuator;

in response to the magnitude of the hydraulic load, selecting from among the plurality of metering modes and a combination of more than one of the plurality of metering modes, thereby producing a metering selection, wherein the metering selection is changed based on a comparison of a previous relationship of the magnitude of the hydraulic load to at least one of the first threshold and the second threshold compared to a subsequent relationship of the magnitude of the hydraulic load to at least one of the first threshold and the second threshold; and operating a flow control device to control flow of fluid to the actuator in response to the metering selection.

8. A method of controlling flow of fluid to an actuator in a hydraulic system that has plurality of metering modes, said method comprising:

determining a magnitude of a hydraulic load for the actuator;

in response to the magnitude of the hydraulic load:

(a) making a transition from a first metering mode to a first combination of the first metering mode and a second metering mode when the magnitude of the hydraulic load is less than a first threshold;

(b) making a transition from the first combination to the second metering mode when the magnitude of the hydraulic load is less than a second threshold;

(c) making a transition from the second metering mode to a second combination of the first metering mode and a second metering mode when the magnitude of the hydraulic load exceeds a third threshold; and (d) making a transition from the second combination to the first metering mode when the magnitude of the hydraulic load exceeds a fourth threshold; and operating a flow control device to control flow of fluid to the actuator in response to making each transition.

9. A method of controlling flow of fluid to an actuator in a hydraulic system that has plurality of metering modes, said method comprising:

selecting a first one of the plurality of metering modes;

operating a flow control device to control flow of fluid to the actuator in response to the first one of the plurality of metering modes;

then selecting a combination of at least two of the plurality of metering modes;

operating the flow control device to control flow of fluid to the actuator in response to the combination;

then selecting a second one of the plurality of metering modes; and operating the flow control device to control flow of fluid to the actuator in response to the second one of the plurality of metering modes.

10. The method as recited in claim 9 further comprising determining a magnitude of a hydraulic load for the actuator; and wherein selecting the combination and selecting a second one of the plurality of metering modes are in response to the magnitude of the hydraulic load.

11. The method as recited in claim 9 wherein first one of the plurality of metering modes is a standard metering mode, and the second one of the plurality of metering modes is a regeneration metering mode.

12. The method as recited in claim 11 wherein the combination is a blend of the standard metering mode and the regeneration metering mode.

13. The method as recited in claim 9 wherein pressure of fluid being supplied to the actuator is controlled in response to a proportion in which more than one of the plurality of metering modes are combined.

14. A method of controlling flow of fluid to an actuator in a hydraulic system that has a standard metering mode and a regeneration metering mode, said method comprising:

determining a magnitude of a hydraulic load for the actuator;

in response to the magnitude of the hydraulic load, selecting the standard metering mode until the magnitude of the hydraulic load traverses a first threshold, selecting the regeneration metering mode when the magnitude of the hydraulic load traverses a second threshold, and selecting a combination of the standard metering mode and the regeneration metering mode when the magnitude of the hydraulic load is between the first threshold and the second threshold, thereby producing a metering selection; and operating a plurality of valves to control flow of fluid to the actuator in response to the metering selection.

15. The method as recited in claim 14 wherein the combination is a proportion of the standard metering mode and the regeneration metering mode determined based on a relationship of the magnitude of the hydraulic load to at least one of the first threshold and the second threshold.

16. The method as recited in claim 14 wherein determination of the metering selection also is based on a comparison of a previous relationship of the magnitude of the hydraulic load to at least one of the first threshold and the second threshold compared to a subsequent relationship of the magnitude of the hydraulic load to at least one of the first threshold and the second threshold.

17. The method as recited in claim 14 wherein the selecting comprises:

making a transition from the standard metering mode to a first combination of the standard metering mode and the regeneration metering mode when the magnitude of the hydraulic load traverses the first threshold;

making a transition from the first combination to the regeneration metering mode when the magnitude of the hydraulic load traverses the second threshold;

making a transition from the regeneration metering mode to a second combination of the standard metering mode and the regeneration metering mode when the magnitude of the hydraulic load traverses a third threshold; and making a transition from the second combination to the standard metering mode when the magnitude of the hydraulic load traverses a fourth threshold.

18. A method of controlling flow of fluid to an actuator in a hydraulic system that selectively operates in a standard metering mode and a regeneration metering mode, said method comprising:

determining a magnitude of a hydraulic load for the actuator;

selecting a first operating state in which only one of the standard metering mode and the regeneration metering mode is active;

selecting, in response to a first condition of the magnitude of the hydraulic load, a second operating state in which combination of the standard metering mode and the regeneration metering mode is active;

selecting, in response to a second condition of the magnitude of the hydraulic load, a third operating state in which only another one of the standard metering mode and the regeneration metering mode is active; and operating a valve assembly to control flow of fluid to the actuator in response to which metering mode or modes are active in the operating state that is currently selected.

19. The method as recited in claim 18 wherein occurrence of the first condition and the second condition are determined by comparing the magnitude of the hydraulic load to a first threshold and a second threshold.

20. The method as recited in claim 19 wherein the second state utilizes the standard metering mode and the regeneration metering mode in a proportion determined based on a relationship of the magnitude of the hydraulic load to at least one of the first threshold and the second threshold.

21. The method as recited in claim 18 wherein the first operating state is selected until the magnitude of the hydraulic load traverses a first threshold, the third operating second state is selected when the magnitude of the hydraulic load traverses a second threshold, and the second state is selected when the magnitude of the hydraulic load is between the first threshold and the second threshold.

22. The method as recited in claim 18 wherein the selecting comprises:

making a transition from the first state to the second state when the magnitude of the hydraulic load traverses a first threshold;

making a transition from the second state to the third state when the magnitude of the hydraulic load traverses a second threshold;

making a transition from the third state to the second state upon the magnitude of the hydraulic load traversing a third threshold; and making a transition from the second state to the first state when the magnitude of the hydraulic load traverses a fourth threshold.

* * * * *